United States Patent
Liu et al.

(10) Patent No.: US 12,237,540 B2
(45) Date of Patent: Feb. 25, 2025

(54) OUTPUT ELECTRODE BASE, BATTERY MODULE, AND ELECTRIC VEHICLE

(71) Applicant: CONTEMPORARY AMPEREX TECHNOLOGY (HONG KONG) LIMITED, Hong Kong (CN)

(72) Inventors: Jun Liu, Ningde (CN); Chengjin Lin, Ningde (CN); Zhiling Li, Ningde (CN); Jihua Yao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 631 days.

(21) Appl. No.: 17/562,877

(22) Filed: Dec. 27, 2021

(65) Prior Publication Data

US 2022/0123441 A1  Apr. 21, 2022

Related U.S. Application Data

(63) Continuation of application No. PCT/CN2020/106466, filed on Jul. 31, 2020.

(30) Foreign Application Priority Data

Sep. 11, 2019  (CN) .......................... 201921515550.1

(51) Int. Cl.
   *H01M 50/517*  (2021.01)
   *H01M 50/249*  (2021.01)
(52) U.S. Cl.
   CPC ....... *H01M 50/517* (2021.01); *H01M 50/249* (2021.01); *H01M 2220/20* (2013.01)
(58) Field of Classification Search
   CPC ............ H01M 50/517; H01M 50/249; H01M 2220/20
   See application file for complete search history.

(56) References Cited

U.S. PATENT DOCUMENTS

2012/0052370 A1   3/2012  Moon
2012/0276442 A1*  11/2012  Kim .................... H01M 50/562
                                                429/179

(Continued)

FOREIGN PATENT DOCUMENTS

CN         1744350 A    3/2006
CN       201413839 Y    2/2010

(Continued)

OTHER PUBLICATIONS

CN-209000986 translation (Year: 2019).*

(Continued)

*Primary Examiner* — Alexander Usyatinsky
(74) *Attorney, Agent, or Firm* — Anova Law Group, PLLC (57) ABSTRACT

This application provides an output electrode base, a battery module, and an electric vehicle, and relates to the technical field of batteries. The output electrode base provided in this application includes: a base body and a connecting member. A cavity is made in the base body. At least a part of the connecting member is located inside the cavity and fixed to the base body. A plurality of first stop blocks are disposed around an outer peripheral wall of the connecting member, and the plurality of first stop blocks are configured to limit movement of the connecting member. The battery module provided in this application includes: a battery cell; an output electrode base provided in this application; and an output electrode connecting plate, fixed to the output electrode base.

10 Claims, 8 Drawing Sheets

(56) References Cited

U.S. PATENT DOCUMENTS

| | | |
|---|---|---|
| 2017/0207428 A1 | 7/2017 | Tononishi |
| 2018/0175363 A1 | 6/2018 | Heid |
| 2020/0152928 A1* | 5/2020 | Cai .................. H01M 50/522 |
| 2022/0123441 A1 | 4/2022 | Liu et al. |

FOREIGN PATENT DOCUMENTS

| | | | |
|---|---|---|---|
| CN | 201779118 U | * | 3/2011 |
| CN | 105118955 A | | 12/2015 |
| CN | 107925045 A | | 4/2018 |
| CN | 209000986 | * | 6/2019 |
| CN | 209000986 U | † | 6/2019 |
| CN | 210110912 U | | 2/2020 |
| JP | 2017015139 | * | 1/2017 |
| JP | 2017015139 A | † | 1/2017 |
| JP | 6268405 B2 | † | 1/2018 |
| KR | 101143335 B1 | † | 6/2012 |
| WO | 2011113058 A1 | | 9/2011 |

OTHER PUBLICATIONS

CN 201779118 U translation (Year: 2011).*
JP-2017015139 translation (Year: 2017).*
The decision of EPO to grant a Patent for Application EP 20863206 (Year: 2024).*
The World Intellectual Property Organization (WIPO) International Search Report and Written opinion for PCT/CN2020/106466 Oct. 28, 2020 19 pages (including English translation).
The European Patent Office (EPO) Extended Search Report for EP Application No. 20863206.7 Jun. 7, 21, 2022 8 Pages.

* cited by examiner
† cited by third party

OUTPUT ELECTRODE BASE, BATTERY MODULE, AND ELECTRIC VEHICLE

CROSS-REFERENCE TO RELATED APPLICATIONS

This application is a continuation application of PCT Patent Application No. PCT/CN2020/106466, entitled "OUTPUT ELECTRODE BASE, BATTERY MODULE, AND ELECTRIC VEHICLE" filed on Jul. 31, 2020, which claims priority to Chinese Patent Application No. 201921515550.1, filed with the State Intellectual Property Office of the People's Republic of China on Sep. 11, 2019, and entitled "OUTPUT ELECTRODE BASE AND BATTERY MODULE", all of which are incorporated herein by reference in their entirety.

TECHNICAL FIELD

Embodiments of this application relate to the field of battery technologies, and in particular, to an output electrode base, a battery module, and an electric vehicle.

BACKGROUND

In an electric vehicle, safety performance of a battery system serving as one of key systems of the electric vehicle directly affects safety of the vehicle.

In a battery module, an output electrode base is mounted on an output end plate of the battery module, and is configured to connect an output electrode connecting plate and provide insulation protection for the output electrode connecting plate. Currently, a base body of the output electrode base is connected to the output electrode connecting plate by a nut. The nut is disposed inside the base body, and a bolt hole is made on the output electrode connecting plate. To implement the connection, a bolt passes through the bolt hole and is bolted to the nut in the base body.

SUMMARY

A plurality of aspects of this application provide an output electrode base, a battery module, and an electric vehicle to mitigate the technical problem of unreliable connection between a nut and an output electrode base in existing technologies.

A first aspect of this application provides an output electrode base, the output electrode base including:
  a base body, the base body being provided with a cavity; and
  a connecting member, where at least a part of the connecting member is located inside the cavity and fixed to the base body.

A plurality of first stop blocks are disposed around an outer peripheral wall of the connecting member, and the plurality of first stop blocks are configured to limit movement of the connecting member.

In a possible design, each of the first stop blocks includes a bulge or a first groove.

Correspondingly, a recess portion or a bulge portion is disposed on an inner peripheral wall of the cavity.

The bulge fits with the recess portion, or the first groove fits with the bulge portion.

In a possible design, the first stop block extends along a height direction H.

Alternatively, the first stop block tilts against a height direction H.

In a possible design, the connecting member further includes a flange, and the flange is located outside the cavity.

The flange includes an upper surface, and a second stop block is disposed on the upper surface.

In a possible design, a third stop block is disposed on the outer peripheral wall of the connecting member, and the third stop block is annular.

Along a height direction H, the third stop block is located in the middle of the connecting member.

A position limiting portion is formed on an inner wall of the cavity, and the position limiting portion fits with the third stop block.

In a possible design, each of the first stop blocks includes a bulge. The bulge includes a first bulge and a second bulge.

Along the height direction H, the first bulge and the second bulge are located at two ends of the third stop block respectively.

In a possible design, a tilt direction of the first bulge is different from a tilt direction of the second bulge.

In a possible design, a tilt angle θ of the first bulge satisfies: 30°<θ<45°; and/or a tilt angle θ of the second bulge satisfies: 30°<θ<45°.

In a possible design, each of the first stop blocks includes a first groove, and the third stop block includes a second groove. A depth of the first groove is different from a depth of the second groove.

A second aspect of this application provides a battery module, including:
  a battery cell;
  any one of the output electrode bases described above; and
  an output electrode connecting plate, fixed to the output electrode base.

A third aspect of this application provides an electric vehicle, including the battery.

In the output electrode base, the battery module, and the electric vehicle described above, the output electrode base includes a base body and a connecting member. A cavity is made in the base body. At least a part of the connecting member is located inside the cavity and fixed to the base body. A plurality of first stop blocks are disposed around an outer peripheral wall of the connecting member, and the plurality of first stop blocks are configured to limit movement of the connecting member. The first stop blocks can fix the connecting member into the base body, and can increase a transmission torque between the connecting member and the cavity. When a bolt is tightened or the connecting member is stressed, the connecting member is not likely to rotate circumferentially or loosen axially, thereby improving reliability of the connection between the connecting member and the base body. A plurality of first stop blocks are disposed around the outer peripheral wall of the connecting member, so as to further increase the transmission torque between the connecting member and the cavity and improve the reliability of the connection between the connecting member and the base body.

Understandably, the foregoing general description and the following detailed description are merely exemplary, and are not intended to limit this application.

BRIEF DESCRIPTION OF DRAWINGS

To describe the technical solutions in the embodiments of this application more clearly, the following outlines the accompanying drawings used in the embodiments. Apparently, the accompanying drawings outlined below are only a part of embodiments of this application. A person of ordi

REFERENCE NUMERALS

1—Connecting member;
11—First stop block;
111—Bulge;
  111a—First bulge;
  111b—Second bulge;
112—First groove;
12—Flange;
121—Upper surface;
  121a—Second stop block;
13—Third stop block;
2—Base body;
21—Cavity;
  211—Position limiting portion;
  212—Recess portion;
3—End plate;
4—Output electrode connecting plate;
5—Bolt;
6—Module connecting plate;
7—Battery cell; and
8—Busbar.

The drawings described here are incorporated into the specification as a part of the specification. The drawings illustrate embodiments of this application and are used together with the specification to interpret the principles of this application.

DETAILED DESCRIPTION OF EMBODIMENTS

For better understanding of the technical solutions of this application, the following describes embodiments of this application in detail with reference to accompanying drawings.

It is apparent that the described embodiments are only a part rather than an entirety of the embodiments of this application. All other embodiments derived by a person of ordinary skill in the art based on the embodiments of this application without making any creative efforts shall fall within the protection scope of this application.

The terms used in the embodiments of this application are intended only for describing specific embodiments rather than for limiting this application. Unless otherwise expressly indicated in the context, the words "a", "the", and "this" that precede a singular noun in the embodiments and claims of this application are intended to include the plural form thereof.

Understandably, the term "and/or" used herein only describes an association relationship between associated objects and indicates existence of three relationships. For example, "A and/or B" may indicate existence of A alone, coexistence of A and B, and existence of B alone. In addition, the character "/" herein generally indicates an "or" relationship between the object preceding the character and the object following the character.

It needs to be noted that directional terms such as "on", "above", "under", "below", "left", and "right" used in the embodiments of this application are described from a perspective shown in the accompanying drawings, and shall not be understood as a limitation on the embodiments of this application. In addition, understandably, depending on the context, one element described as being connected "on" or "under" another element not only means that the element may be directly connected "on" or "under" the other element, but also means that the element may be indirectly connected "on" or "under" the other element through an intermediate element.

In some circumstances, the nut includes a threaded inner hole and a cylindrical outer periphery. During movement of the vehicle, the battery module vibrates along with the vehicle. During the vibration and impact, a joint between the nut and the output electrode base is likely to become loose or even rotate circumferentially, thereby leading to an unreliable connection between the nut and the output electrode base and affecting performance of the battery module.

Figure 1:
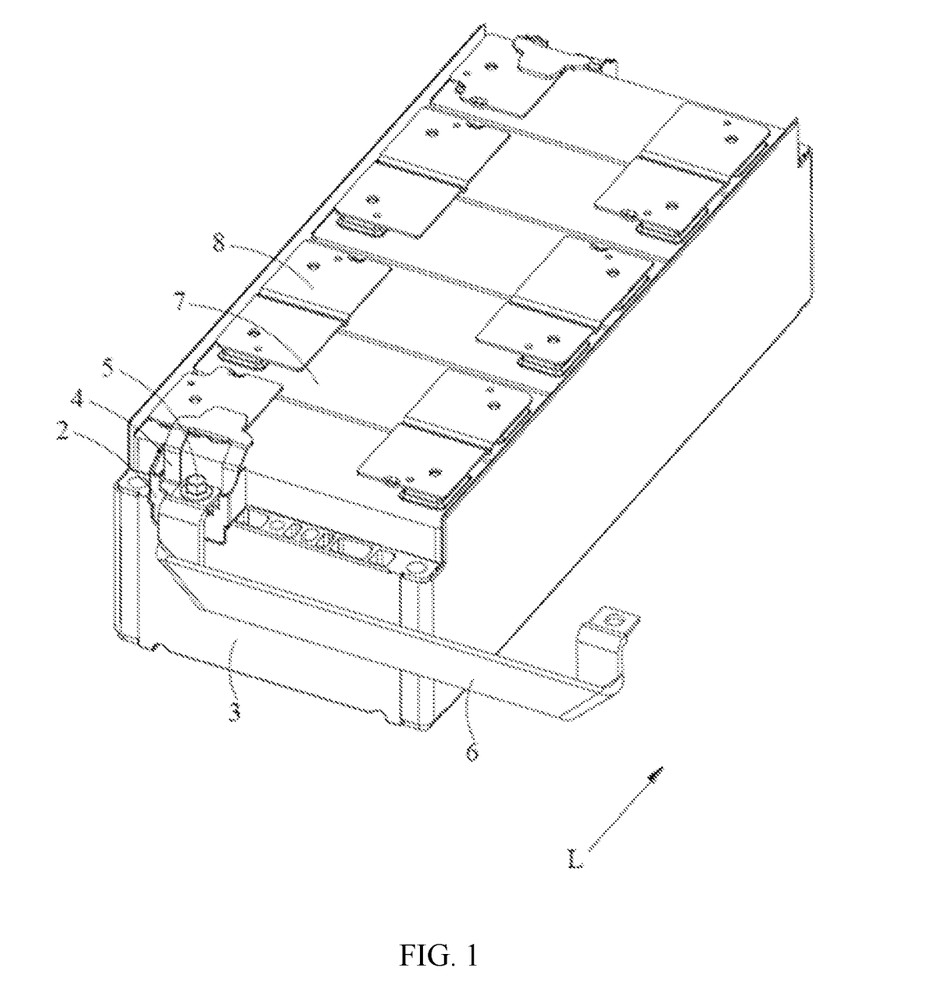
- FIG. 1 is a schematic structural diagram of a battery module according to an embodiment of this application.
Figure 2:
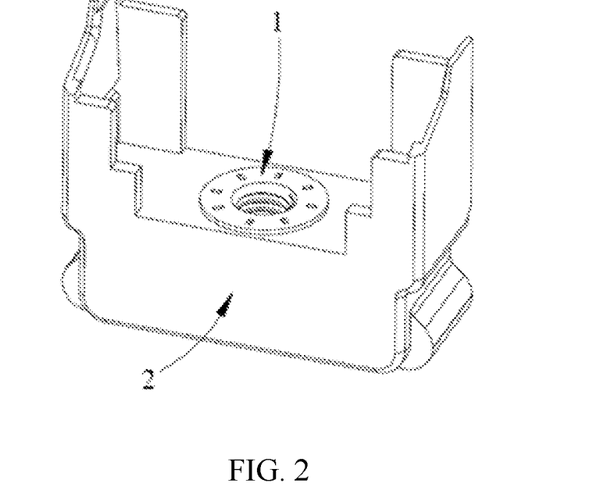
FIG. 2 is a schematic structural diagram of an output electrode base according to an embodiment of this application.
Figure 3:
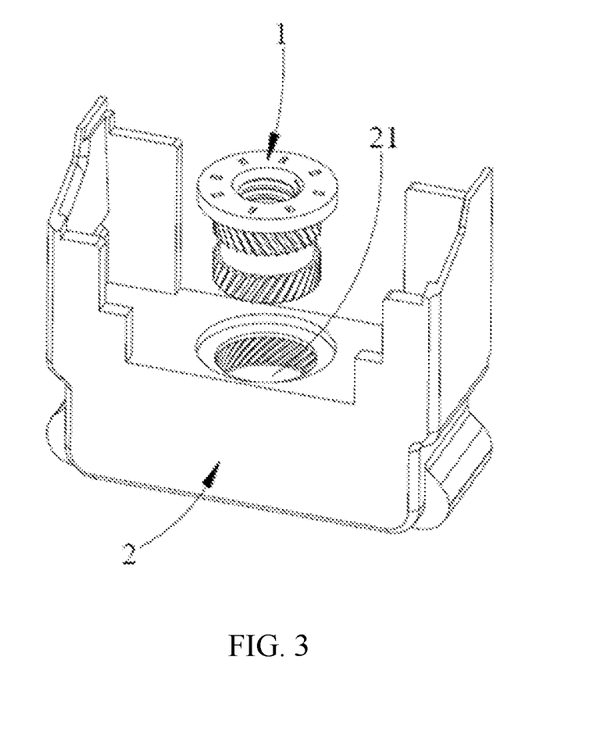
FIG. 3 is an exploded view of an output electrode base according to an embodiment of this application.
Figure 4:
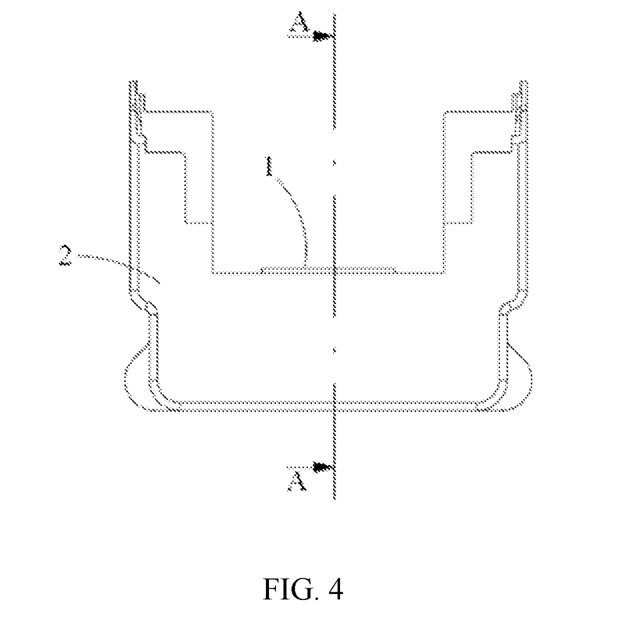
FIG. 4 is a front view of an output electrode base according to an embodiment of this application.
Figure 5:
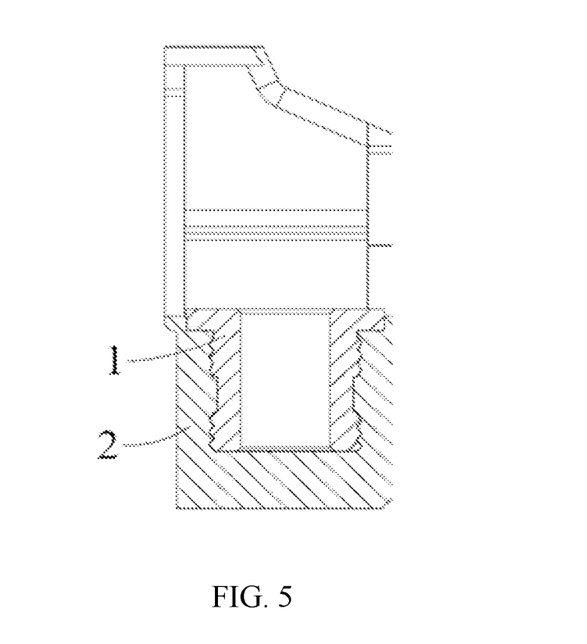
FIG. 5 is a sectional view in an A-A direction of FIG. 4.
Figure 6:
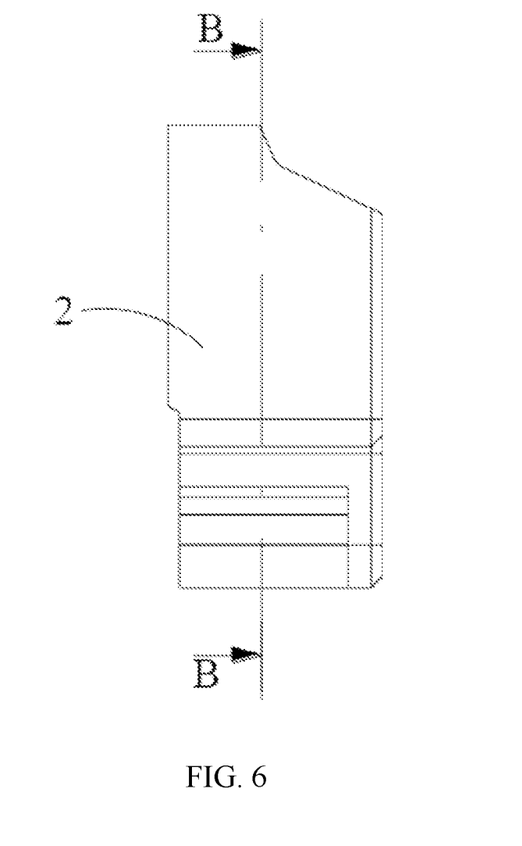
FIG. 6 is a side view of an output electrode base according to an embodiment of this application.
Figure 7:
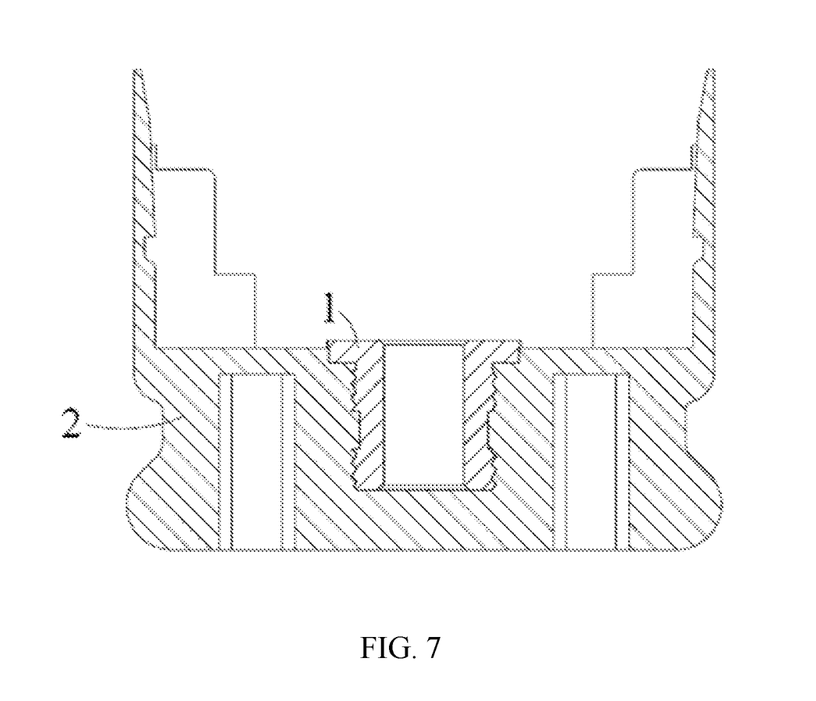
FIG. 7 is a sectional view in a B-B direction of FIG. 6.
Figure 8:
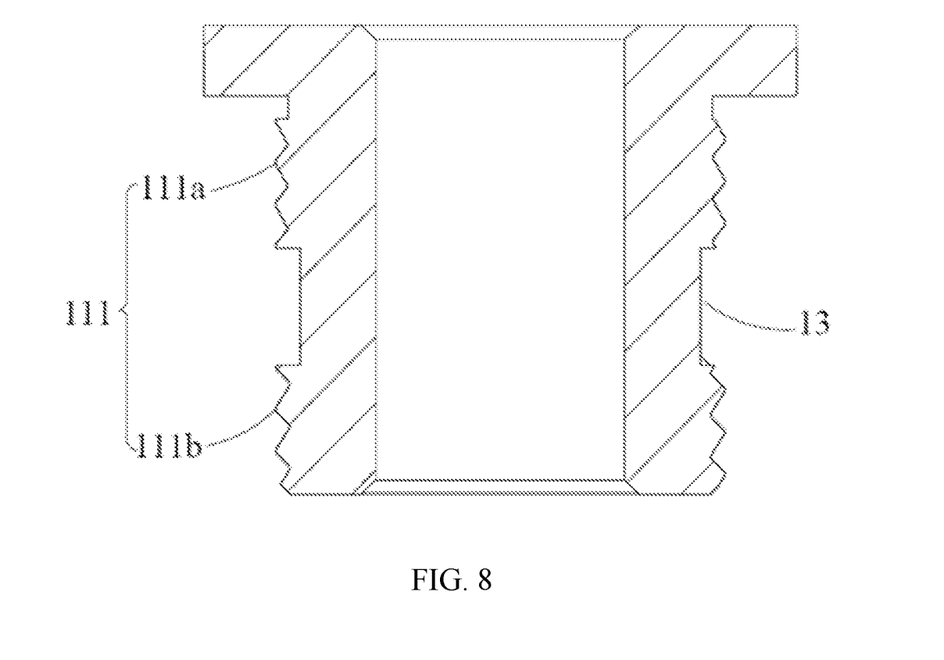
FIG. 8 is a sectional view of a connecting member.
Figure 9:
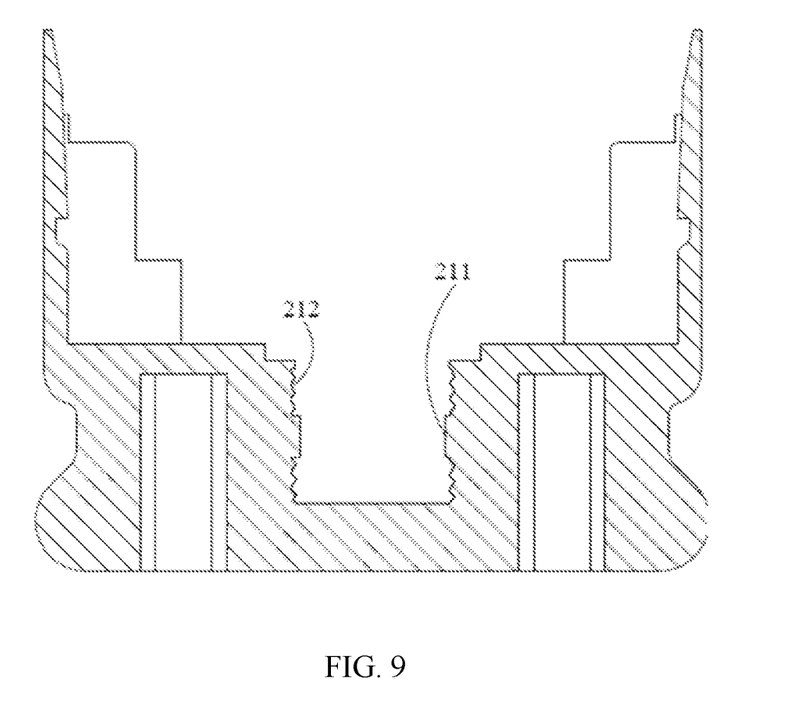
FIG. 9 is a sectional view of a base body.
Figure 10:
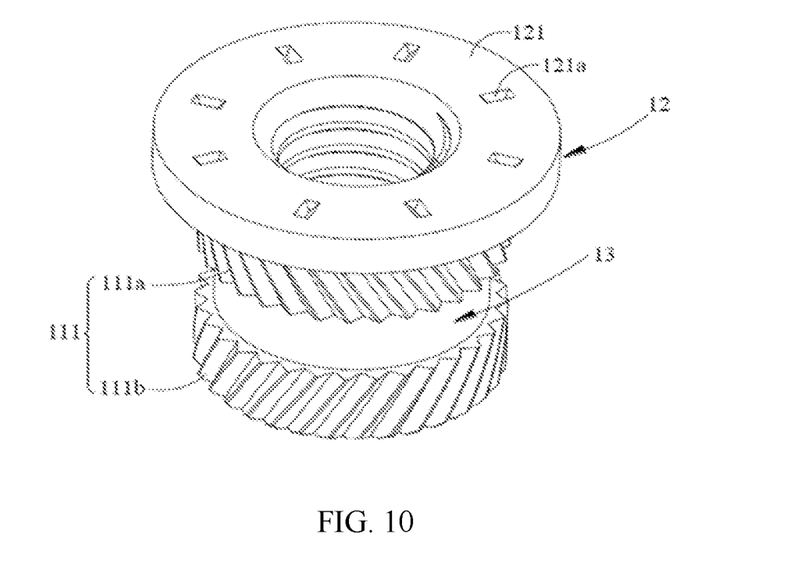
FIG. 10 is a first schematic structural diagram of a connecting member in an output electrode base body according to an embodiment of this application.
Figure 11:
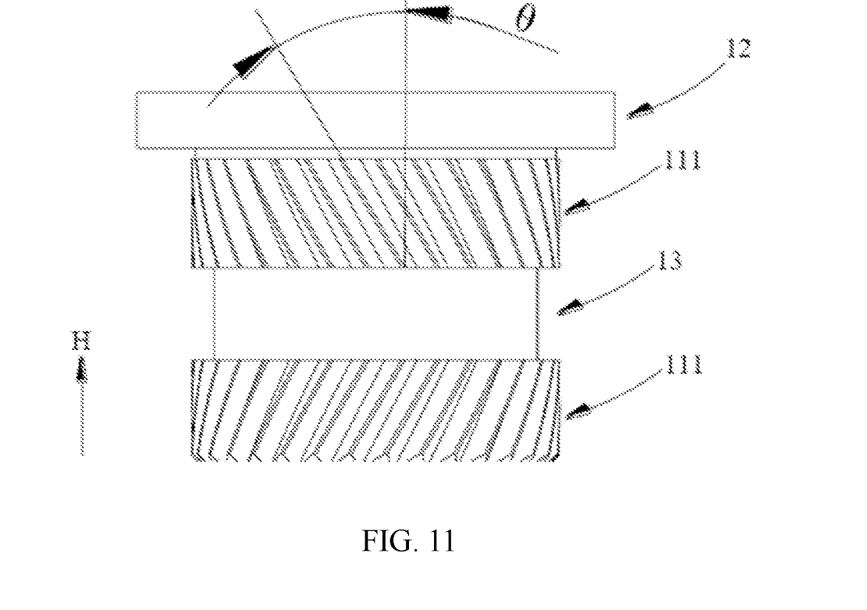
FIG. 11 is a front view of FIG. 10.
Figure 12:
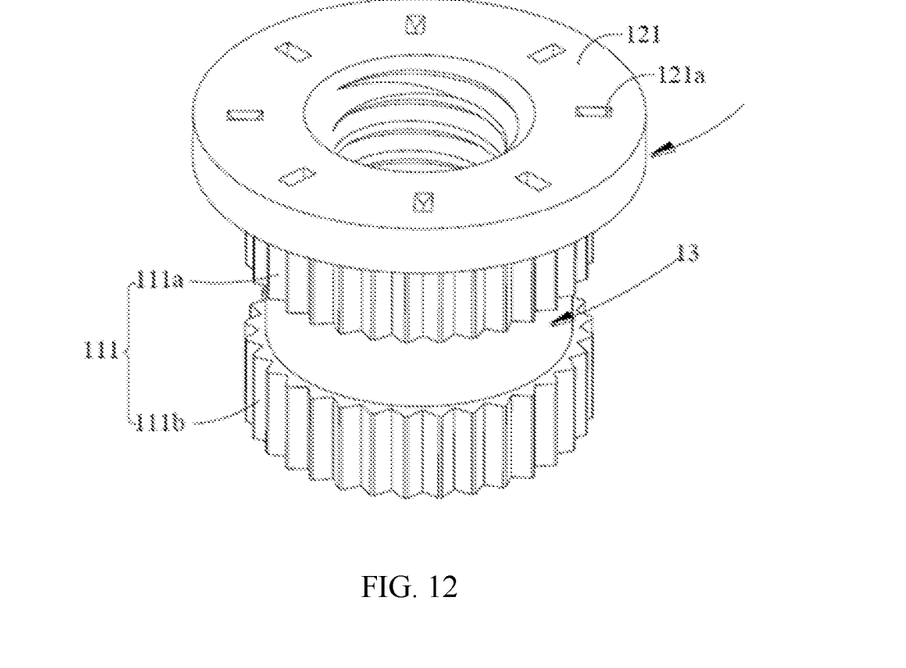
FIG. 12 is a second schematic structural diagram of a connecting member in an output electrode base body according to an embodiment of this application.
Figure 13:
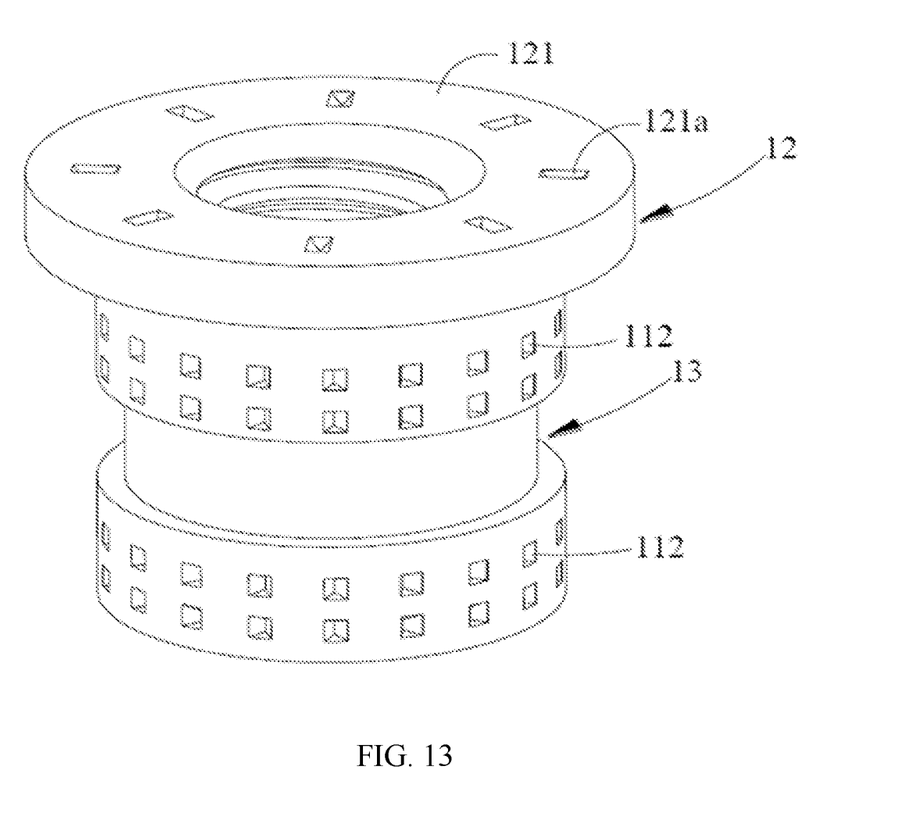
FIG. 13 is a third schematic structural diagram of a connecting member in an output electrode base body according to an embodiment of this application.

FIG. 1 is a schematic structural diagram of a battery module according to an embodiment of this application; FIG. 2 is a schematic structural diagram of an output electrode base according to an embodiment of this application; FIG. 3 is an exploded view of an output electrode base according to an embodiment of this application; FIG. 4 is a front view of an output electrode base according to an embodiment of this application; FIG. 5 is a sectional view in an A-A direction of FIG. 4; FIG. 6 is a side view of an output electrode base according to an embodiment of this application; FIG. 7 is a sectional view in a B-B direction of FIG. 6; FIG. 8 is a sectional view of a connecting member 1; FIG. 9 is a sectional view of a base body 2; FIG. 10 is a first schematic structural diagram of a connecting member 1 in an output electrode base body 2 according to an embodiment of this application; FIG. 11 is a front view of FIG. 10; FIG. 12 is a second schematic structural diagram of a connecting member 1 in an output electrode base body 2 according to an embodiment of this application; and FIG. 13 is a third schematic structural diagram of a connecting member 1 in an output electrode base body 2 according to an embodiment of this application.

As shown in FIG. 1, in the battery pack, adjacent battery modules are connected by a module connecting plate 6, and the module connecting plate 6 is connected to output electrodes of the adjacent battery modules. Specifically, a mounting hole is made on the module connecting plate 6 correspondingly. A bolt 5 of an output electrode base is mounted in the mounting hole correspondingly, thereby implementing an electrical connection between a plurality of battery modules.

A battery module includes a plurality of battery cells 7 and a frame structure. The battery cells 7 may be secondary batteries that can be reused by charging and discharging. The battery cells 7 are interconnected by a busbar 8. The frame structure includes end plates 3, side plates, a top plate, and a bottom plate that are connected to each other. Each of the end plates 3 is located at one end of the output electrode of the battery module and is configured to resist an expansion force of the battery cells 7. The plurality of battery cells 7 are located in an inner cavity of the frame structure and stacked on each other in the inner cavity along a length direction L, a width direction or a height direction.

In addition, the battery module further includes an output electrode base. The output electrode base is configured to provide insulation protection for the output electrode connecting plate 4 in the battery module.

When a plurality of battery modules are connected to form a battery pack, the module connecting plate 6 is connected to each output electrode base by a plurality of bolts 5. The positioning of the module connecting plate 6 can be implemented by the plurality of bolts 5.

As shown in FIG. 2, FIG. 3, FIG. 4, FIG. 5, FIG. 6, FIG. 7, FIG. 8, and FIG. 9, the output electrode base provided in this embodiment of this application includes a base body 2 and a connecting member 1. A cavity 21 is made in the base body 2. At least a part of the connecting member 1 is located inside the cavity 21 and fixed to the base body 2. A plurality of first stop blocks 11 are disposed around an outer peripheral wall of the connecting member 1, and the plurality of first stop blocks 11 are configured to limit movement of the connecting member 1.

The base body 2 may be made of plastic or a plasticized material. The connecting member 1 is made of metal. The connecting member 1 is fixed to the base body 2 and can be fixedly connected to the output electrode connecting plate 4 of the battery module. Therefore, the connecting member 1 can fix the output electrode connecting plate 4 onto the base body 2 to serve a purpose of connecting and fastening the output electrode connecting plate 4. In addition, the base body 2 is an injection-molded plasticized structure or plastic structure, that is, an injection molded part, and therefore, can provide insulation protection for the output electrode connecting plate 4.

The connecting member 1 is injection-molded into the base body 2 to implement a fixed connection between the connecting member 1 and the base body 2. The bolt 5 is fixedly connected, and specifically, may be threadedly connected, to the connecting member 1. A mounting hole that fits with the bolt 5 is made on the output electrode connecting plate 4. To implement the connection, the bolt 5 fixed to the base body 2 can be inserted into the corresponding mounting hole, thereby implementing the fixed connection between the base body 2 and the output electrode connecting plate 4.

The first stop blocks 11 can fix the connecting member 1 into the base body 2, and can increase a transmission torque between the connecting member 1 and the cavity 21. When the bolt 5 is tightened or the connecting member 1 is stressed, the connecting member 1 is not likely to rotate circumferentially or loosen axially, thereby improving anti-torsion and anti-tension capabilities of the connecting member 1 inside the base body 2 and improving reliability of the connection between the connecting member 1 and the base body 2. A plurality of first stop blocks 11 are disposed around the outer peripheral wall of the connecting member 1, thereby further increasing the transmission torque between the connecting member 1 and the cavity 21, improving the anti-torsion and anti-tension capabilities of the connecting member 1 inside the base body 2, and improving the reliability of the connection between the connecting member 1 and the base body 2.

When the base body 2 is made of a non-metallic material such as plastic or a plasticized material, a plurality of first stop blocks 11 are disposed on the outer peripheral wall of the connecting member 1, thereby improving the reliability of the connection between the non-metallic material and the connecting member 1.

Each of the first stop blocks 11 may be a bulge 111, a first groove 112, or another structure as long as the structure can increase the transmission torque between the connecting member 1 and the cavity 21, increase the anti-torsion capability of the connecting member 1 inside the base body 2, and make the connecting member 1 unlikely to rotate circumferentially or loosen axially.

In a possible implementation, as shown in FIG. 9, FIG. 10, FIG. 11, and FIG. 12, a first stop block 11 includes a bulge 111. One or more bulges 111 may be disposed. Recess portions 212 are disposed on an inner peripheral wall of the cavity 21 correspondingly, and the bulges 111 fit with the recess portions 212 one by one. The bulges 111 may be continuous bulges 111, or may be a plurality of bulges 111 spaced apart. Heights of the bulges 111 may be the same or different. As shown in FIG. 12, the bulge 111 may be plural in number. The plurality of bulges 111 are arranged around the outer peripheral wall of the connecting member 1. The bulges 111 arranged around the outer peripheral wall of the connecting member 1 can increase the transmission torque between the connecting member 1 and the cavity 21. When the bolt 5 is tightened or the connecting member 1 is stressed, the connecting member 1 is not likely to rotate circumferentially or loosen axially, thereby improving reliability of the connection between the connecting member 1 and the base body 2.

As shown in FIG. 13, the first stop block 11 may further include a first groove 112. One or more first grooves 112 may be disposed. Correspondingly, bulge portions are disposed on an inner peripheral wall of the cavity 21, and the first grooves 112 fit with the bulge portions. When a plurality of first grooves 112 are disposed, the depths of the plurality of first grooves 112 may be the same or different, and the sizes of the first grooves 112 may be the same or different. The plurality of first grooves 112 disposed around the outer peripheral wall of the connecting member 1 can increase the transmission torque between the connecting member 1 and the cavity 21. When the bolt 5 is tightened or the connecting member 1 is stressed, the connecting member 1 is not likely to rotate circumferentially or loosen axially, thereby improving reliability of the connection between the connecting member 1 and the base body 2.

In a possible implementation, each of the first stop blocks 11 extends along the height direction, or each of the first stop blocks 11 tilts against the height direction, so as to increase the transmission torque between the connecting member 1 and the cavity 21 and improve the reliability of the connection between the connecting member 1 and the base body 2. Optionally, when the first stop block 11 is a bulge 111, as shown in FIG. 12, the bulge 111 extends along the height direction H. As shown in FIG. 10 and FIG. 11, the bulge 111 tilts against the height direction H. Nevertheless, when the first stop block 11 is the first groove 112, the first groove 112 extends along the height direction H, or the first groove 112 tilts against the height direction H. Optionally, the first stop block 11 tilts against the height direction H, so as to greatly increase an area of contact with the base body 2 and increase tightness of the connection between the first stop block and the base body. When a fairly great torsion or shearing force is received, several first stop blocks 11 can prevent the connecting member 1 from rotating, thereby improving the reliability of the connection between the connecting member 1 and the base body 2.

As shown in FIG. 8, FIG. 9, FIG. 10, FIG. 11, FIG. 12, and FIG. 13, a third stop block 13 is disposed on the outer peripheral wall of the connecting member 1. The third stop block 13 is annular. Along the height direction H, the third stop block 13 is located in the middle of the connecting member 1, and can divide the first stop block 11 into an upper part and a lower part. The third stop block 13 may be a bulge or a groove. A position limiting portion 211 is formed on the inner wall of the cavity 21. The position limiting portion 211 fits with the third stop block 13, so as to reduce a possibility of detaching the connecting member 1 from the cavity 21 under a tension, improve the anti-tension capability of the connecting member 1 inside the base body 2, make the connecting member 1 unlikely to loosen axially, and improve the reliability of the connection between the connecting member 1 and the base body 2. The term "middle" referred to in this embodiment is not an exact middle position. The third stop block 13 is deemed to be located in the middle of the connecting member 1 as long as the third stop block 13 can divide the first stop block 11 into two parts along the height direction H.

As shown in FIG. 10, FIG. 11, and FIG. 12, the first stop block 11 includes a bulge 111. The bulge 111 includes a first bulge 111a and a second bulge 111b. Along the height direction H, the first bulge 111a and the second bulge 111b are located at two ends of the third stop block 13 respectively. The first bulge 111a and the second bulge 111b can make the connecting member 1 unlikely to rotate circumferentially or loosen axially. The third stop block 13 can reduce the possibility of detaching the connecting member 1 from the cavity 21 under a tension, thereby increasing the anti-torsion and anti-tension capabilities of the connecting member 1 inside the base body 2, and improving the reliability of the connection between the connecting member 1 and the base body 2.

In a possible implementation, a tilt direction of the first bulge 111a is different from a tilt direction of the second bulge 111b. When the bolt 5 is tightened or the connecting member 1 is stressed, the connecting member 1 is not likely to rotate circumferentially or loosen axially, thereby improving the reliability of the connection between the connecting member 1 and the base body 2.

As shown in FIG. 11, a tilt angle θ of the first bulge 111a satisfies: 30°<θ<45°, and/or a tilt angle θ of the second bulge 111b satisfies: 30°<θ<45°, thereby increasing the tightness of the connection between the connecting member 1 and the base body 2. When a fairly great torsion or shearing force is received, several first bulges 111a and second bulges 111b can prevent the connecting member 1 from rotating. When the bolt 5 is tightened or the connecting member 1 is stressed, the connecting member 1 is not likely to rotate circumferentially or loosen axially, thereby improving the reliability of the connection between the connecting member 1 and the base body 2.

In a possible implementation, the first stop block 11 includes a first groove 112, and the third stop block 13 includes a second groove. The depth of the first groove 112 is different from the depth of the second groove. Therefore, the torsion and the tension received by the connecting member 1 can be distributed to the first groove 112 and the second groove, thereby improving the reliability of the connection between the connecting member 1 and the base body 2.

In a possible implementation, the connecting member 1 further includes a flange 12, and the flange 12 is located outside the cavity 21, thereby increasing the area of contact between the connecting member 1 and the module connecting plate 6 and improving a current-carrying capacity. The flange 12 includes an upper surface 121. A second stop block 121a is disposed on the upper surface 121. The second stop block 121a may be a groove, or a bulge, or an anti-skid texture. The second stop block 121a disposed on the upper surface 121 of the flange 12 can increase a friction coefficient of the upper surface 121, improve an anti-loosening capability of the connecting member 1, and improve the reliability of the connection between the connecting member 1 and the module connecting plate 6.

In another embodiment of this application, the battery module described above may be referred to as a battery.

The foregoing descriptions are merely embodiments of this application, but are not intended to limit this application. A person skilled in the art understands that various modifications and variations may be made to this application. Any modifications, equivalent replacements, improvements, and the like made without departing from the spirit and principles of this application fall within the protection scope of this application.

What is claimed is:

1. An output electrode base, comprising:
    a base body, the base body being provided with a cavity; and
    a connecting member, wherein at least a part of the connecting member is located inside the cavity and fixed to the base body,
    wherein:
        a plurality of first stop blocks are disposed around an outer peripheral wall of the connecting member, and the plurality of first stop blocks are configured to limit movement of the connecting member;
        a second stop block is disposed on the outer peripheral wall of the connecting member, and the second stop block is annular;
        along a height direction, the second stop block is located in the middle of the connecting member;
        a position limiting portion is formed on an inner wall of the cavity, and the position limiting portion fits with the second stop block; and
        each of the plurality of first stop blocks comprises a first groove, the second stop block comprises a second groove, and a depth of the first groove is different from a depth of the second groove.

2. The output electrode base according to claim 1, wherein:
    a bulge portion is disposed on an inner peripheral wall of the cavity; and
    the first groove fits with the bulge portion.

3. The output electrode base according to claim 2, wherein:
    each of the plurality of first stop blocks extends along a height direction; or
    each of the plurality of first stop blocks tilts against a height direction.

4. The output electrode base according to claim 1, wherein:
the connecting member further comprises a flange, and the flange is located outside the cavity; and
the flange comprises an upper surface, and a third stop block is disposed on the upper surface.

5. The output electrode base according to claim 1, wherein:
each of the plurality of first stop blocks further comprises a bulge, and the bulge comprises a first bulge and a second bulge; and
along the height direction, the first bulge and the second bulge are located at two ends of the second stop block respectively.

6. The output electrode base according to claim 5, wherein:
a tilt direction of the first bulge is different from a tilt direction of the second bulge.

7. The output electrode base according to claim 6, wherein:
a tilt angle θ of the first bulge satisfies: 30°<θ<45°; and/or
a tilt angle θ of the second bulge satisfies: 30°<θ<45°.

8. A battery module, comprising:
a battery cell;
the output electrode base according to claim 1; and
an output electrode connecting plate, fixed to the output electrode base.

9. An electric vehicle, comprising the battery module according to claim 8.

10. An output electrode base, comprising:
a base body, the base body being provided with a cavity; and
a connecting member, wherein at least a part of the connecting member is located inside the cavity and fixed to the base body,
wherein:
a plurality of first stop blocks are disposed around an outer peripheral wall of the connecting member, and the plurality of first stop blocks are configured to limit movement of the connecting member;
a second stop block is disposed on the outer peripheral wall of the connecting member, and the second stop block is annular;
along a height direction, the second stop block is located in the middle of the connecting member;
a position limiting portion is formed on an inner wall of the cavity, and the position limiting portion fits with the second stop block;
each of the plurality of first stop blocks comprises a bulge, and the bulge comprises a first bulge and a second bulge;
along the height direction, the first bulge and the second bulge are located at two ends of the second stop block respectively;
a tilt direction of the first bulge is different from a tilt direction of the second bulge; and
a tilt angle θ of the first bulge satisfies: 30°<θ<45°, and/or a tilt angle θ of the second bulge satisfies: 30°<θ<45°.

* * * * *